United States Patent

[11] 3,592,083

[72] Inventor Minoru Kawabata
  Chita-gun, Aichi-ken, Japan
[21] Appl. No. 839,542
[22] Filed July 7, 1969
[45] Patented July 13, 1971
[73] Assignee Toyoda Koki Kabushiki Kaisha
[32] Priority July 13, 1968
[33] Japan
[31] 43/49476

[54] AUTOMATIC TRANSMISSION CONTROL SYSTEM
  14 Claims, 20 Drawing Figs.
[52] U.S. Cl................................................... 74/868,
  74/645, 137/81.5, 417/218
[51] Int. Cl.......................................................B60k 21/06,
  F15c 1/08, F04b 49/08
[50] Field of Search............................................ 74/868,
  869, 645; 91/3; 137/81.5

[56] References Cited
UNITED STATES PATENTS

| | | | |
|---|---|---|---|
| 3,401,581 | 9/1968 | Chana............................ | 74/868 X |
| 3,457,847 | 7/1969 | Furlong.......................... | 137/81.5 X |
| 3,473,418 | 10/1969 | Ullery............................ | 74/868 |
| 3,508,565 | 4/1970 | Strantz.......................... | 137/81.5 |

OTHER REFERENCES
PRODUCT ENGINEERING Dec. 6, 1965 pp. 65— 70 " Fluid Amplifiers Go Commercial" copy in cl. 137 sub. 81.5

Primary Examiner—William L. Freeh
Assistant Examiner—Thomas C. Perry
Attorney—Blum, Moscovitz, Friedman & Kaplan ABSTRACT: An automatic transmission control system which comprises a pressure fluid supply source for supplying pressure fluid, a shift valve for selectively actuating friction engaging means to complete diverse driving connections between a drive shaft and a driven shaft, and a group of pure fluid control elements which have no movable parts and may control the pressure fluid in response to vehicle speed and throttle opening to selectively actuate the shift valve.

| Fig.13A | Fig.5B |
|---|---|
| Fig.13C | |
| | Fig.5D |

Fig. 13C

AUTOMATIC TRANSMISSION CONTROL SYSTEM

BACKGROUND OF THE INVENTION

This invention relates to automatic transmission control systems for automotive vehicles and more particularly, though not exclusively, to a control system provided with a hydraulic control circuit comprising a pressure fluid supply source for actuating fluid-actuated hydraulic actuators for a plurality of friction engaging means to complete driving connections between a drive shaft and a driven shaft, and a group of pure fluid control elements for automatically controlling the pressure fluid supplied from the supply source in response to the driven shaft speed or vehicle speed and engine torque demand or throttle opening, thereby to change the actuations of the hydraulic actuators.

Conventionally, driving connections between a drive shaft and a driven shaft have been accomplished by the selective actuations of friction engaging means which frictionally engage a planetary gear unit. In such selective actuations of the friction engaging means, it is important that the selective actuations are controlled in response to vehicle speed and throttle opening, and further it is important to preset the change points or upshift point and downshift point. The approach of the upshift point and the downshift point must be avoided to remove unstable running conditions of the vehicle. At the same time, speed control in the shiftings and high reliability in the actuations must be fully considered to remove the discomfort due to shocks caused in the actuations.

Conventionally, various hydraulic control circuits have been provided to satisfy the above-mentioned conditions. However, known hydraulic control circuits are complex and expensive in manufacture, since they utilize spool valves having lands of different diameters which are required to be precisely slidably mounted in respective valve housings to uncover and block the respective valve ports, so that valve means having the spool valves are required to be used in interconnected relationship. Further, the actuation of the valve means has often been incorrect due to the presence of even a very small amount of foreign substance in fluid, since clearance between the valve body and the spool valve is very small. Therefore, it has been insufficient for the valve means to satisfy all of that above-mentioned conditions of optimum functioning.

In the conventional automatic transmissions for automotive vehicles, the fluid pressure applied to the friction engaging means has been reduced by a pressure-regulating valve in reverse proportion to vehicle speed to avoid abrupt and sudden engagement and disengagement of the friction engaging means at high vehicle speed and also to reduce the power consumed in pressure sources. For pressure sources, gear pumps or vane-type pumps of constant displacement type have been generally used to deliver pressure fluid, and excess fluid delivered by the pumps has been exhausted to a sump through the pressure-regulating valve. The power consumed in the pumps which are generally driven by a drive shaft driven by an engine and a driven shaft drivingly connected to the drive wheels respectively in increased with increase in the volume of pump-delivered fluid which is, in turn, increased in substantially proportional relationship with the increase in engine speed and vehicle speed, since the power for driving the pump is generally given by the product of pump-delivered fluid pressure and the volume of pump-delivered fluid.

For example, where the engine speed of rotation is 500 r.p.m. at idling speed and is 5,000 to 6,000 r.p.m. at maximum high speed, pump-delivered fluid is increased by about 10 times at maximum high speed over that at idling speed. However, pump-delivered pressure is decreased to about one-half to one-third by the pressure-regulating valve.

Therefore, the power for driving the pumps is increased by about three to five times at high vehicle speed range. Since the large engaging force for the friction engaging means is required in a kickdown operation which requires the large driving torque to be transmitted to the driven shaft, pump-delivered pressure must be increased to avoid slipping. Therefore, the abrupt and sudden increase in the power consumed in the pumps causes a decrease in the force for accelerating the vehicle.

In the control system of the present invention, pure fluid control means having no movable parts are used and the pressure-regulating valve is eliminated by using pumps of the variable capacity type, and further pump delivered pressure is maintained constant so that the fluid flow delivered from the pumps is maintained at substantially constant through low- to high-speed range of the automotive vehicle.

SUMMARY OF THE INVENTION

It is an object of the invention to provide an improved automatic transmission control system for an automotive vehicle to obviate the above-mentioned conventional disadvantages.

Another object of the invention is to provide a control system which is simple in construction, inexpensive in manufacture and reliable in operation.

Another object of the invention is to provide a control system comprising pure fluid control means having no movable parts for controlling pressure fluid in response to vehicle speed and throttle opening to control actuations of friction engaging means, whereby driving connections between a drive shaft and a driven shaft are automatically changed.

Another object of the invention is to provide a control system having a fluid supply source without a pressure-regulating means which is adapted to apply regulated pressure corresponding to driving torque to be transmitted.

A further object of the invention is to provide a control system comprising a fluid supply source having at least one pump of the variable capacity type for supplying pressure fluid at required pressure or required flow rate through low- to high-speed range, whereby a pressure-regulating means and excessive delivered fluid are excluded and the loss of power consumed in the pump is less than that in the conventional control systems.

A still further object of the invention is to provide a control system comprising pure fluid control means having no movable parts and a fluid supply source having at least one pump of the variable capacity type for supplying pressure fluid at required pressure or required flow rate, thereby to control the actuation speed of hydraulic actuators for friction engaging means to avoid shocks caused in the changes thereof.

A still further object of the invention is to provide a control system comprising pure fluid control means having no movable parts, thereby to increase fluid pressure supplied to a torque converter to prevent the cavitation therein.

DESCRIPTION OF THE DRAWINGS

The foregoing and other objects of the present invention will become fully apparent from the following description of some preferred embodiments of the present invention with reference to the accompanying drawings, in which:

FIG. 5 is a schematic diagram of a hydraulic control circuit for the transmission according to the invention in which the component FIGS. 5A, 5B, 5C and 5D are relatedly connected to form a complete view;

FIG. 12 is a diagrammatic view of a hydraulic control circuit in which main line pressure is maintained constant by using constant flow rate pumps. In FIG. 12, the component sub-FIGS. 5A, 5B, 5C and 12D are relatedly connected to form a complete view;

In FIG. 13 the component sub-FIGS. 13A, 5B, 13C, 5D form a complete view.

DESCRIPTION OF THE INVENTION

Figure 1:
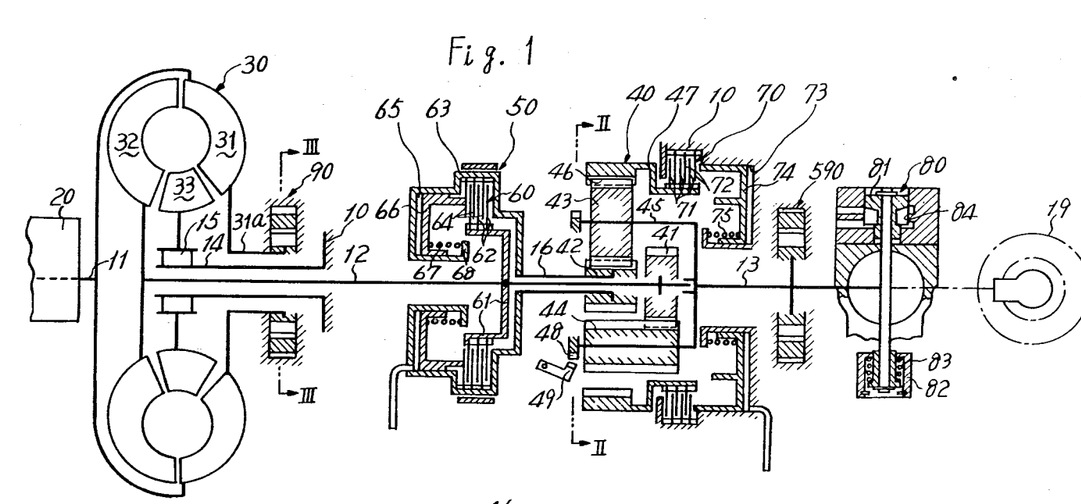
FIG. 1 is a schematic view of a transmission construction.

Referring now to the drawings and more particularly to FIG. 1 showing an automatic transmission mechanism according to the present invention, a drive shaft 11 is connected to an engine output shaft of an engine 20. An intermediate shaft 12 is connected to the drive shaft 11 through a hydraulic torque converter indicated generally at 30. A driven shaft 13 is connected to the intermediate shaft 12 through a planetary gear unit indicated generally at 40. The shafts 11, 12 and 13 are coaxial with one another, each of said shafts rotatably journaled in a transmission casing 10.

The hydraulic torque converter includes a bladed impeller member 31, a bladed turbine member 32 and a bladed stator member 33. The impeller 31 is connected to the drive shaft 11 to be directly rotated by the engine output shaft. The turbine 32 is located opposite to the impeller 31 and connected to the intermediate shaft 12. The stator 33 is mounted on the one end of a hollow shaft 14 through a one-way brake 15. The other end of the hollow shaft 14 is secured to the transmission casing 10. Thus, as long as a differential in speed between the impeller 31 and the turbine 32 exists, the stator 33 functions as a reaction member for fluid passing from the impeller 31 through the turbine 32 thereto and thereby the torque transmitted to the turbine 32 is increased. On the other hand, when the differential in speed between the impeller 31 and the turbine 32 becomes less, the one-way brake 15 permits the stator 33 to rotate with the impeller 31 to reduce the power loss in transmitting operation.

Figure 2:
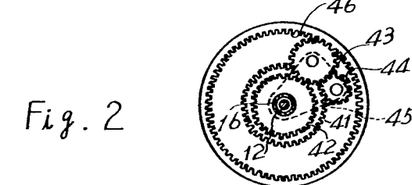
FIG. 2 is a view showing the engaging relationship of a planetary gear unit taken along the line II–II of FIG. 1.

The planetary gear unit 40 includes a first sun gear 41, a second sun gear 42, a relatively axially short pinion 43, a relatively axially long pinion 44, a planet carrier 45 and a ring gear 46. Fixedly mounted on the right end of the intermediate shaft 12 is the first sun gear 41 which is concentric with the second sun gear 42 which is connected to a hollow shaft 16 rotatably journaled on the intermediate shaft 12. The relatively long planet pinion 44 meshes with the first sun gear 41 and the relatively short planet pinion 43 meshes with the second sun gear 42. The planet pinions 43 and 44 are both carried by the planet carrier 45. The relatively short pinion 43 further meshes with the ring gear 46.

The planet carrier 45 is connected to the driven shaft 13 which is drivingly connected to drive wheels 19 in any well-known manner.

To establish driving connections through respective gear trains, there are provided friction engaging means such as a friction band 50, a friction clutch 60 and a reverse friction brake 70.

The reverse friction brake 70 comprises a plurality of friction plates 71 secured to an axially extending portion 47 which extends from the ring gear 46, and a plurality of friction plates 72 secured to the transmission casing 10 and interleaved between the friction plates 71. The reverse friction brake 70 is frictionally engaged by the leftward movement of a piston 74 which is slidably mounted in a hydraulic actuator 73 formed within the transmission casing 10 to lock the ring gear 46 against rotation. On the other hand, when pressure fluid is not supplied to the hydraulic actuator 73, the reverse friction brake 70 is released by the force of a compression spring 75 which acts to urge the piston 74 rightwardly.

The friction clutch 60 comprises a plurality of friction plates 62 which are secured to the external surface of a supporting member 61 secured in turn to the intermediate shaft 12, and a plurality of friction plates 64 which are secured on the internal surface of an annular member 63 and are interleaved between the friction plates 62. The annular member 63 is connected to the second sun gear 42 through the hollow shaft 16, thereby to be rotatably journaled about the intermediate shaft 12. The friction clutch 60 is engaged by the rightward movement of a piston 66 which is slidably mounted in a hydraulic actuator 65 formed within the annular member 63. A compression spring 67 is interposed between a projected portion 68 which is integrally formed with the annular member 63 and the piston 66, and acts to urge the piston 66 leftwardly.

Figure 5:
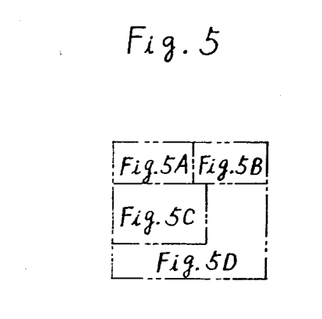

Outwardly of the annular member 63 is provided the friction band 50, one end of which is secured to the transmission casing 10. The other end of the friction band 50 is connected to a piston rod 53 of a piston 54 mounted in a bore 52 of a hydraulic actuator 51, as shown in FIG. 5. On movement of the other end of the friction band 50 toward the one end thereof due to the upward movement of the piston rod 53, the friction band 50 frictionally engages with the annular member 63 to cause the annular member 63 to be locked against rotation. Thus the second sun gear 42 is, in turn, locked relative to the transmission casing 10.

On the driven shaft 13 is provided a governor valve 80 responsive to vehicle speed or rotating speed of the driven shaft 13. The governor valve 80 comprises a valve casing 84, a spool valve 81, weights 82 and a spring 83. On movement of the spool valve 81 by centrifugal force acting on the spool valve 81 and the weights 82, governor pressure proportional to vehicle speed is produced.

Figure 3:
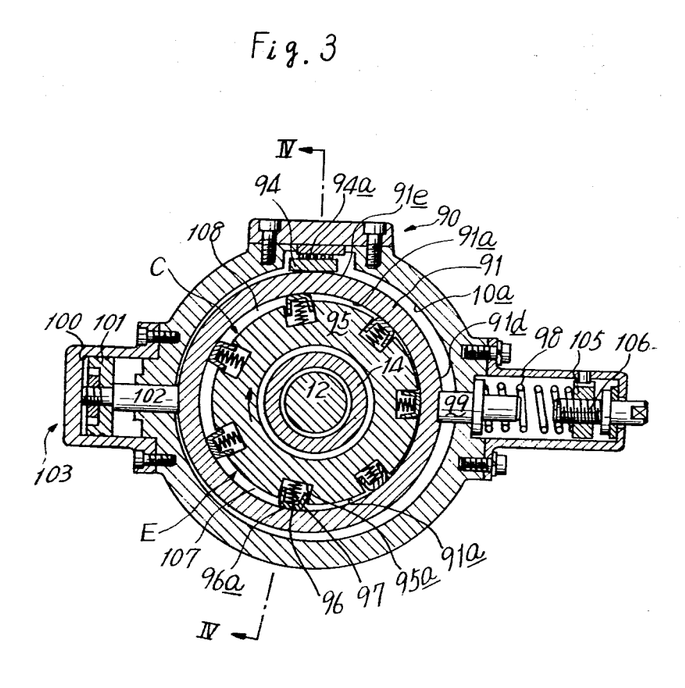
FIG. 3 is a sectional view of a front pump taken along the line III–III of FIGS. 1 and 4.
Figure 4:
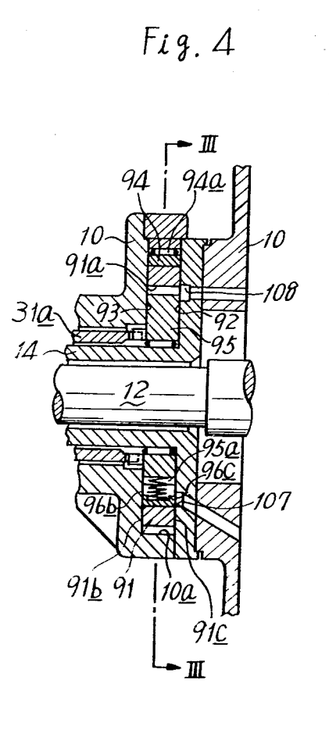
FIG. 4 is a sectional view taken along the line IV—IV of FIG. 3.

A front pump driven by the drive shaft 11 is indicated at 90 and a rear pump driven by the driven shaft 13 as indicated at 590. Since the fundamental construction of both pumps 90 and 590 is similar, the description of the front pump 90 is given here and that of the rear pump 590 is omitted. As shown in FIGS. 3 and 4, the front pump 90 which is of the variable capacity type comprises a pump rotor 95, a plurality of radially movable sliding elements 96 equiangularly spaced apart from one another on the periphery of the pump rotor 95, and a pump casing 91, the eccentricity of which relative to the rotor 95 is automatically regulated as hereinafter described in detail, and which surrounds the pump rotor 95 and elements 96. The front pump 90 is disposed within a pump casing 10a formed within the transmission casing 10. The rotor 95 is concentrically journaled on the stationary hollow shaft 14 and is connected to one end of a sleeve member 31a which extends from the impeller 31 of the torque converter 30. Therefore, the rotor 95 is driven by the engine output shaft.

A plurality of slots 95a to receive respective elements 96 are provided on the periphery of the rotor 95 in equally spaced relationship. Each outer face 96a of the elements 96 is always slidably engaged with a cylindrical inner face 91a of the pump casing 91 by means of a compression spring 97 interposed between the respective slot 95a and the element 96. Opposite end 96b and 96c of each element 96 slidably abut casing sidewalls 92 and 93. Thus the space defined between the pump casing 91 and the rotor 95 is separated into a plurality of pumping chambers. The pump casing 91 is of annular shape, opposite ends 91b and 91c of which slidably abut the casing sidewalls 92 and 93.

The eccentricity of the pump casing 91 relative to the axis of rotation of the rotor 95 is variable. A plunger 99, which is constantly urged by a spring 98 seated between the plunger and a spring seat 105 in the direction such that the eccentricity of the pump casing 91 is increased, engages an outer surface of 91d of the pump casing 91. The compression force of the spring 98 may be varied with the adjustment of a screw 106 which engages with the spring seat 105. On the other hand, on the opposite side of the plunger 99 relative to the axis of rotation of the rotor 95 is disposed a plunger 102 which is connected to a piston 101. The piston 101 is slidably mounted within a chamber 100 of a hydraulic actuator 103 secured to the transmission casing 10. Pump delivery fluid is admitted into the chamber 100 from the front pump 90 for moving the piston 101 rightwardly to urge the pump casing 91 against the spring 98, whereby the eccentricity of the pump casing 91 may be decreased. A receiving seat 94, which is tangentially slidably held by pins or bearings 94a, engages an outer surface 91e of the pump casing 91 at the high-pressure zone to receive the casing biasing force produced at pumping action, thereby to operatively promote the response to the adjustment of the eccentricity of the pump casing 91.

On the casing sidewall 92, an intake port 107 of arcuate shape is formed over the expanding zone E in the pumping chamber, while a delivery port 108 of arcuate shape is formed over the contracting zone C in the pumping chamber.

In the front pump 90 constructed as above described, the eccentricity of the pump casing 91 may be automatically regulated, even if the speed of rotation of the rotor is widely varied, whereby constant pressure fluid regulated by the preset force of the spring 98 is delivered from the pump 90.

A rotor 595 of the rear pump 590 is adapted to be driven from the driven shaft 13. The eccentricity of a pump casing 591 which surrounds the rotor 595 can be automatically regulated as well as that of the pump casing 91 of the front pump 90. In the rear pump 590, the eccentricity of the pump casing 591 is also automatically regulated to deliver substantially constant pressure fluid, even if the speed of rotation of the driven shaft 13 is varied.

Pressure fluid from the pumps 90 and 590 is supplied to actuate the friction engaging means. When fluid flow for the friction engaging means is not required, pump delivery capacity is automatically reduced by decreasing the eccentricity of the pump casing to a value less than that required in change of gear connections, whereby unnecessary power, consumption by the pumps, is reduced.

The above-mentioned transmission may provide two forward speeds or gear ratios and reverse. For low speed ratio, the friction band 50 is engaged and the friction clutch 60 and the reverse friction brake 70 are released. Under these conditions the annular member 63 is locked and the second sun gear 42 is in turn locked against rotation through the hollow shaft 16. The intermediate shaft 12 and the first sun gear 41 are rotated by the engine output shaft through the hydraulic torque converter 30, whereby each of the planet pinions 43 and 44 is caused to rotate about its own axis and simultaneous to rotate about the intermediate shaft 12. The rotary motion round the intermediate shaft 12 is transmitted to the driven shaft 13 through the planet carrier 45. The gear connection established in the manner as above described becomes the low gear connection which is at a reduced speed ratio. During this speed ratio the ring gear 46 is not restrained but is free to rotate.

For high-speed ratio, the friction clutch 60 is engaged and the friction band 50 and the reverse friction brake 70 are released. Under these conditions, the hollow shaft 16 is locked with respect to the intermediate shaft 12, and the first sun gear 41 and the second sun gear 42 rotate as one body. Consequently, the relative rotary motion between the planet pinions 43 and 44 is prevented so that the direct drive from the intermediate shaft 12 to the driven shaft 13 is established, thereby to complete the high gear connection.

For reverse drive, the reverse friction brake 70 is engaged and the friction band 50 and the friction clutch 60 are released. Under these conditions, the ring gear 46 is locked against rotation, while the second sun gear 42 is free to rotate. With rotation of the first sun gear 41 through the intermediate shaft 12, each of the planet pinions 43 and 44 is caused to rotate around its own axis and simultaneously around the intermediate shaft 12. This rotary motion around the intermediate shaft 12 is reverse to that in the low gear connection, and the driven shaft 13 is reversely rotated at a reduced speed ratio.

The pressure fluid supply circuit embodied in the present invention comprises the front pump 90, the rear pump 590 and return branch lines which are connected to a sump 109, and in which fluid flows continuously. Fluid pressure delivered from the pumps 91 and 591 are respectively applied to the chambers 100 and 600 of the hydraulic actuators 103 and 603 to vary the eccentricity of the pump casings 91 and 591, whereby fluid under substantially constant pressure is supplied from the pumps 90 and 590 to lines 120 and 121 connected to delivery ports 110 and 610 (see FIG. 5D). The lines 120 and 121 are connected through respective check valves 140 and 141 to a common main supply line 122, and fluid under substantially constant pressure is supplied to the main supply line 122 through the check valves 140 and 141 only when the pressures in the lines 120 and 121 is higher than that in the main line 122. Connected to the pump delivery port 610 in the rear pump 590 is a line 121a in which a fixed orifice 142 is provided. A line 123 which extends from the fixed orifice 142 is connected to a port 85 of the governor valve 80. Pressure in the line 123 is regulated in accordance with vehicle speed or rotary speed of the driven shaft 13 by means of the governor valve 80. The regulated pressure or governor pressure is supplied through the line 123 to a control nozzle 212 of a first control element 210, a control nozzle 233 of a third control element 230 and a control nozzle 242 of a fourth control element 240. The first to fourth control elements inclusive are pure fluid control elements each of which comprises a main supply nozzle, two control nozzles, two output ports and vents. Each of the output ports receives fluid flow deflected by a control jet from the control nozzle which impinges on a main jet from the main supply nozzle, as hereinafter described.

Figure 5A:
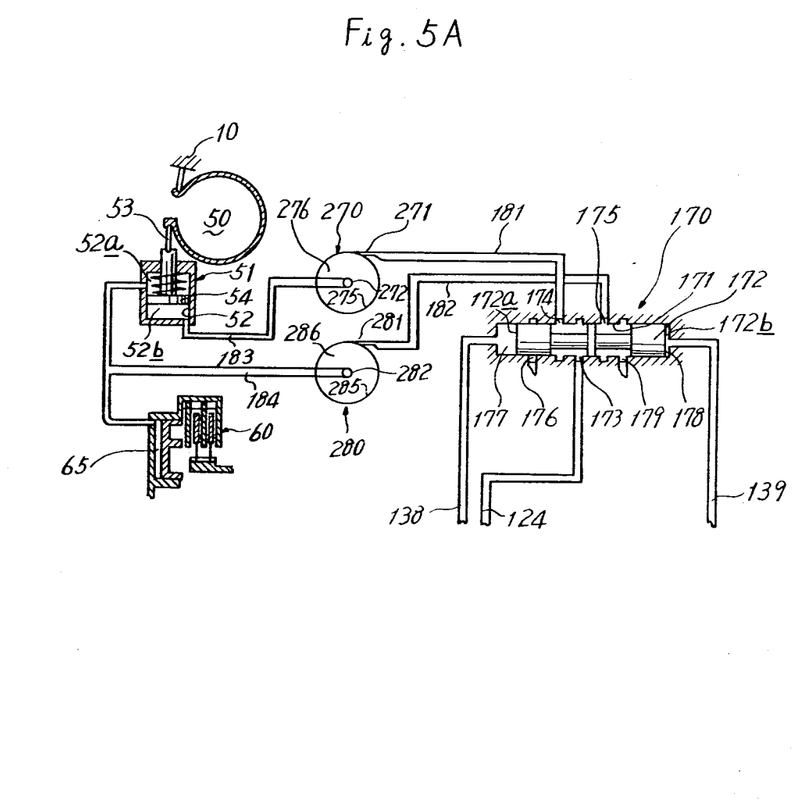
Figures 5B, 5D:
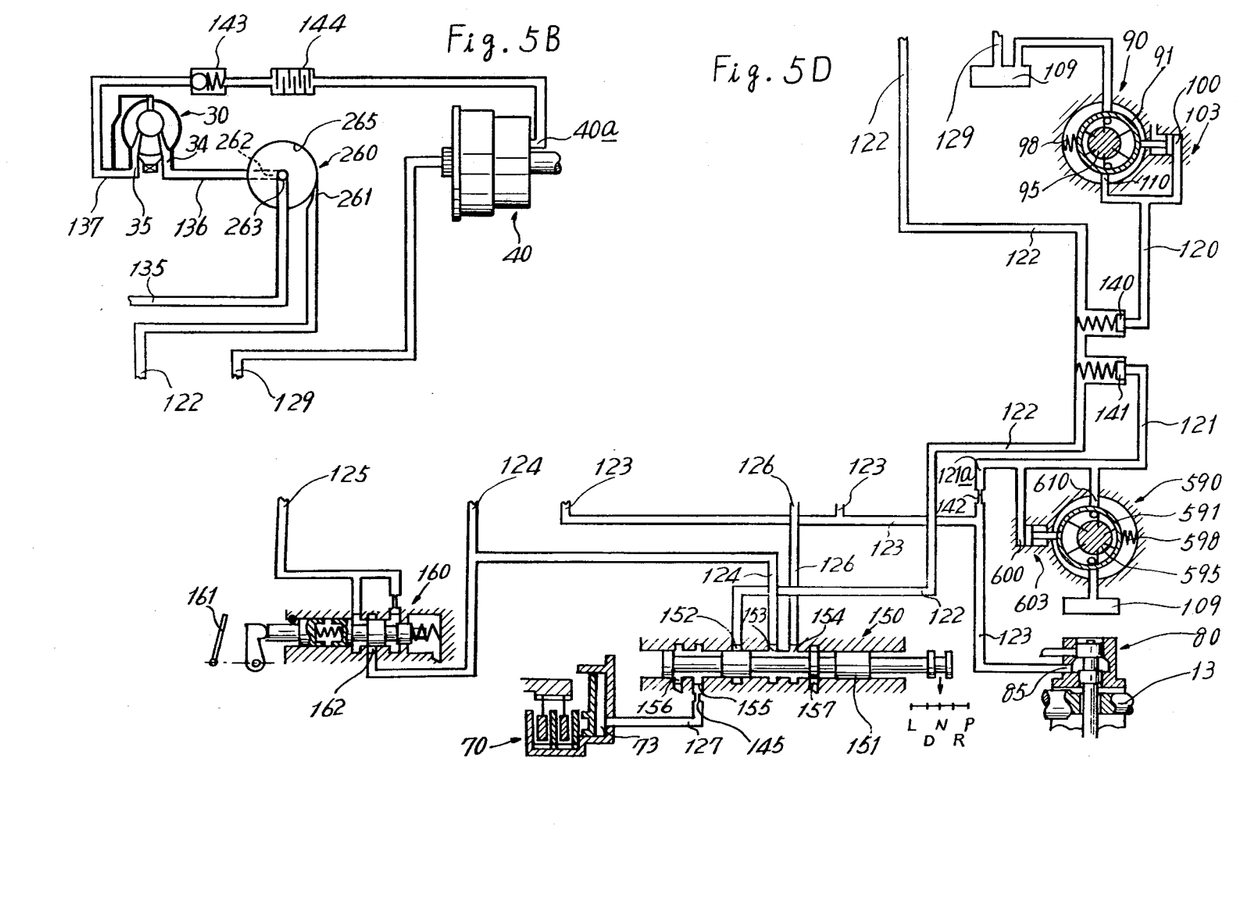

The one end of the line 122 is connected to a port 152 of a selector valve 150 and the other thereof is connected to a main supply nozzle 261 of a vortex-type element 260 FIG. 5B.

The vortex-type element 260 is provided with cylindrical hollow chamber 265, the main supply nozzle 261 being tangentially disposed in the peripheral wall of the hollow chamber 265, an output port 262 connected to a pressure fluid inlet port 34 of the torque converter 30 through a line 136 and a control port 263 connected to a line 135, the output port 262 and control port 263 being oppositely disposed in the centers of both sidewalls of the hollow chamber 265. When high transmitting torque is required in the operation of the vehicle, upon the admission of control flow into the control port 263 from the line 135, the vortex-type element 260 acts to increase the fluid pressure in the line 136 to prevent the cavitation in the torque converter 30, whereby the required high transmitting torque is obtained.

A pressure fluid outlet port 35 of the torque converter 30 is connected to a lubrication port 40a of the planetary gear unit 40 through a line 137, a check valve 143 and an oil cooler 144, whereby fluid flow from the torque converter 30 is exhausted into the sump 109 through a line 129 after being utilized for lubrication.

The selector valve 150 (FIG. 5D) is provided to set the automatic transmission for drive or D, low or L, and reverse or R operation as well as neutral or N, and parking or P. The selector valve 150 includes a spool valve 151 slidably mounted within a valve body. Each of ports 152, 153, 154, 155, 156 and 157 is uncovered or blocked by the movement of the spool valve 151 for conditioning the automatic transmission for the five operations D. L, R, N and P. A line 124 connected to the port 153 of the selector valve 150 communicates with a port 162 of a throttle valve 160 actuated in conjunction with an accelerator pedal 161, a main supply nozzle 221 through an orifice 229 and a control nozzle 222 of a second control element 220, a main supply nozzle 251 through an orifice 259 of a fifth control element 250, and a port 173 of a shift valve 170.

The throttle valve 160 (FIG. 5D) regulates fluid pressure from the line 124 in accordance with a throttle opening to supply the regulated pressure or throttle pressure to a control nozzle 213 of the first control element 210 through a line 125 in a well-known manner. A line 126 connected to the port 154 of the selector valve 150 communicates with a main supply nozzle 211 of the first control element 210, a main supply nozzle 231 and a control nozzle 232 of the third control element 230, and a main supply nozzle 241 and a control nozzle 243 of the fourth control element 240. The port 155 of the selector valve 150 is connected to the hydraulic actuator 73 for the reverse friction brake 70 through a fixed orifice 145 in a line 127. The ports 156 and 157 are connected to the return branch lines to exhaust fluid to the sump 109.

The first control element 210 (FIG. 5C) is a pure fluid control element of the type of a jet deflection proportional amplifier or an analog amplifier. The first control element 210 is provided with the main supply nozzle 211, a pair of control nozzles 212 and 213, a pair of output ports 214 and 215, a center vent 216 between both output ports 214 and 215, a side vent 217 between the control nozzle 212 and the output port 214, and a side vent 218 between the control nozzle 213 and the output port 215. Each of the vents is connected to the sump 109 through return branch lines which work as flow restrictors to build up the required pressure in the circulation system. In the absence of a control flow from each of control nozzles 212 and 213, a main jet from the main supply nozzle 211 is equally divided between the two output ports 214 and 215. When a control flow is applied to the control nozzle 212 the main jet is deflected rightwardly (as viewed) so that more of the main jet flows through the output port 215 and less flows through the output port 214. Conversely, when a control flow is applied to the control nozzle 213 the main jet is deflected leftwardly so that more of the main jets flows through the output port 214 and less flows through the output port 215. Main jet deflection is proportional to the control flow. When control flows are simultaneously applied to both control nozzles 212 and 213, main jet deflection actually varies in proportion to the momentum differential between the control flows. However, the main jet deflection is proportional to the pressure differential between the control flows, since the control nozzles are symmetrically formed with respect to each other. As a result, all output which changes continuously in accordance with the pressure differential between the control flows may be obtained from the fluid analog amplifier.

Figure 5C:
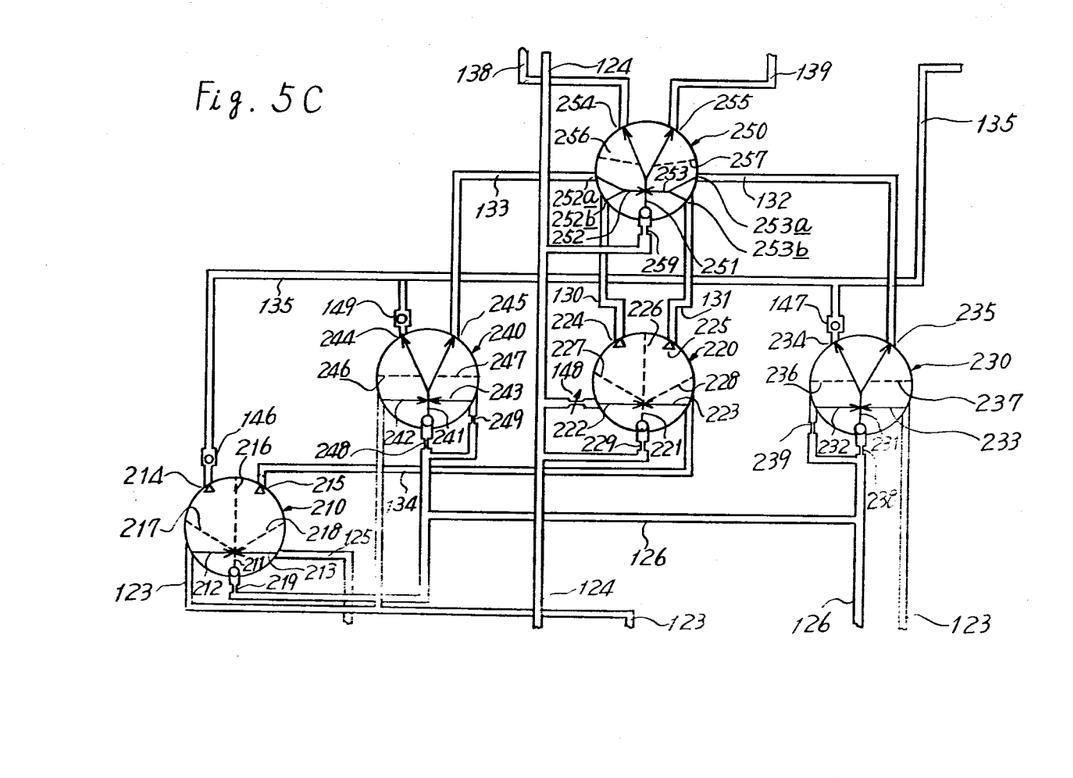

The second control element 220 is also a pure fluid control element of the type of a jet deflection proportional amplifier, and is similar to the first control element 210 in its characteristics. The second control element 220 is also provided with the main supply nozzle 221, a pair of control nozzles 222 and 223, a pair of output ports 224 and 225, a center vent 226, and side vents 227 and 228.

The output port 215 of the first control element 210 connected by a line 134 to the control nozzle 223 of the second control element 220, and the other output port 214 thereof is connected to the line 135 through a check valve 146. The main supply nozzle 221 of the second control element 220 is connected to the line 124 and the control nozzle 222 is also connected to the line 124 through a variable orifice 148 which is provided to determine the value of a deflection force to condition, in a manner described hereinafter, the transition point from the low gear connection to the high gear connection, and vice versa in the drive range.

The third control element 230 (FIG. 5C) is a digital amplifier of the wall attachment type. The third control element 230 is provided with the main supply nozzle 231, a pair of control nozzles 232 and 233, a pair of output ports 234 and 235, a side vent 236 between the output port 234 and the control nozzle 232, and a side vent 237 between the output port 235 and the control nozzle 233. When a main jet is applied to the main supply nozzle 231, the fluid flows from either the output port 234 or the output port 235. The main jet can be switched from one output port to the other by applying a control flow to the control nozzle. For example, assume that the main flow is issuing initially from the output port 234. The main jet is deflected to the left and attaches to the wall of a duct directed to the output port 234 at a position downstream from the control nozzle 232. The deflection of the main jet to the output port 234 is kept stable by so-called "Coanda effect" or wall attachment effect. When a control flow is introduced into the control nozzle 232, the main jet moves to the right in response to the control fluid pressure. The main jet then attaches to the wall of a duct directed to the output port 235 and continues to exit from the output port 235 even if the control flow in the control nozzle 232 is later removed. A fluid pulse applied to the control nozzle 233 is required to cause the main jet to switch back to the output port 234.

The fourth control element 240 (FIG. 5C) is also a digital amplifier of a wall attachment type, and is similar in construction and characteristics to the third control element 230. The fourth control element 240 is also provided with the main supply nozzle 241, a pair of control nozzles 242 and 243, a pair of output ports 244 and 245 and a pair of side vents 246 and 247.

The fifth control element 250 (FIG. 5C) is also a type of a wall attachment, and is substantially similar in characteristics to the third control element 230. The fifth control element 250 is also provided with the main supply nozzle 251, a pair of control nozzles 252 and 253, a pair of output ports 254 and 255 and a pair of side vents 256 and 257, and differs from the third control element 230 in that the control nozzles 252 and 253 are respectively provided with two control input ports 252a and 252b, and 253a and 253b.

The main supply nozzles 231 and 241 of the third and fourth control elements are connected to the line 126 through respective orifices 238 and 248, and control nozzles 232 and 243 are also connected to the line 126 through respective orifices 239 and 249. The control nozzles 233 and 242 are connected to the line 123 and are supplied with fluid regulated by the governor valve 80. The output ports 234 and 244 are connected through respective check valves 147 and 149 to the line 135, and the output ports 235 and 245 are respectively connected to the control input ports 253a and 252a of the fifth control element 250 through lines 132 and 133. The control nozzles 252b and 253b are respectively connected to the output ports 22—4 and 225 of the second control element 220 by lines 130 and 131. The output ports 254 and 255 of the fifth control element are respectively connected to pressure chambers 177 and 178 of the shift valve 170 by lines 138 and 139.

The shift valve 170 includes a spool valve 172 slidably mounted in a valve body 171, and a plurality of ports 173, 174 and 175, 176 and 179. The spool valve 172 is adapted axially to be moved in the valve body 171 by fluid pressure acting on either an end 172a or an end 172b thereof so that the port 173 is connected to either the port 174 or 175. The ports 176 and 179 are exhaust ports and connected to the sump 109 through the return branch lines when the port 173 is connected to the port 174, the port 175 is connected to the exhaust port 179. On the other hand, when the port 173 is connected to the port 175, the port 174 is connected to the exhaust port 176. The ports 174 and 175 are respectively connected by lines 181 and 182 to nozzles 271 and 281 of pure fluid vortex-type elements 270 and 280 FIG. 5A.

The vortex-type elements 270 and 280 comprise circular hollow chambers 275 and 285, the nozzles 271 and 281, sidewalls 276 and 286, and ports 272 and 282, respectively. The nozzles 271 and 281 are tangentially disposed in the peripheral walls of the hollow chambers 275 and 285, respectively, and the ports 272 and 282 are respectively disposed in the centers of the sidewalls 276 and 286. When flow is introduced from each of the nozzles 271 and 281 into each of the hollow chambers 275 and 285, the flow follows a spiral-vortex path, thus encountering relatively high flow resistance. On the other hand, when flow is introduced from each of the ports 272 and 282 into the chambers 275 and 285, the flow follows a radial path to each of the nozzles 271 and 281, thus encountering relatively low flow resistance. As a result, each of the vortex-type elements 270 and 280 functions as a diode.

The port 272 of the vortex-type element 270 is connected by a line 183 to a rear pressure chamber 52b to which pressure fluid is applied to engage the friction band 50, and the port 282 of the vortex-type element 280 is connected by a line 184 to a front pressure chamber 52a in which pressure fluid is introduced to disengage the friction band 50 and to the hydraulic actuator 65 in which pressure fluid is applied to engage the friction clutch 60.

Throttle pressure regulated in accordance with throttle opening is supplied to the control nozzle 213 of the first control element 210 through the line 125, and governor pressure proportional to the speed of the driven shaft 13 is supplied to the control nozzle 212 of the first control element 210 through the line 123, so that the main jet from the main supply nozzle 211 is deflected in accordance with pressure differential between throttle pressure and governor pressure to vary output pressure into the output ports 214 and 215. Only the output pressure in the output port 215 is applied to the control nozzle 223 as control pressure to control the second control element 220. The main nozzle jet of the second control element 220 is also deflected by pressure differential between the control pressure supplied to the control nozzle 223 from the output port 215 of the first control element 210 and biasing pressure which is supplied to the control nozzle 222 and determines what value of the pressure in the control nozzle 223 deflects the main jet, thereby to produce a pressure differential between the output ports 224 and 225. Due to the pressure differential between the output ports 224 and 225, the fifth control element 250 is controlled.

OPERATION OF THE CONTROL SYSTEM

The engagement and disengagement of the friction engaging means are selected by the selector valve 150 which may change the passages of pressure fluid passing therethrough except in the drive range. In other words, the actuations of the friction engaging means, in drive range, are automatically changed from low to high gear connection or vice versa and in the other ranges, manually settled through the selector valve 150.

NEUTRAL RANGE

When the spool valve 151 is moved to the neutral or N position, the port 152 thereof which is connected to the main supply line 122 is blocked, and none of the friction engaging means is actuated for completing the various gear trains.

LOW RANGE

When the spool valve 151 is moved to the low or L position, the main supply line 122 is connected only to the port 153 through the port 152 of the selector valve 150. Thus, main line pressure is supplied through line 124 to the port 162 of the throttle valve 160, the main nozzle 221 and the control nozzle 222 of the second control nozzle 220, the main nozzle 251 of the fifth control nozzle 250, and the port 173 of the shift valve 170. In these conditions, the main jet in the second control element 220 is deflected to the output port 225, since the control pressure in the control nozzle 223 is lower than that in the control nozzle 222. The main jet in the fifth control element 250 is in turn deflected to the output port 254, and enters the pressure chamber 177 of the shift valve 170 through the line 138, so that the spool valve 172 is moved to the right and the port 173 is communicated with the port 174. Thus, the pressure fluid in the main line is supplied to the rear pressure chamber 52b of the hydraulic actuator through the line 181, the nozzle 271, the port 272 of the vortex-type element 270, and the line 183. As a result, only the friction band 50 is engaged.

REVERSE RANGE

When the spool valve 151 is moved to the reverse or R position, the main supply line 122 is connected solely to the port 155 through the port 152 of the selector valve 150, and thus the pressure fluid in the main line 122 is supplied to the hydraulic actuator 73 through the line 127. As a result, the reverse friction clutch 70 is engaged.

PARKING RANGE

When the spool valve 151 is moved to the parking or P position, the main supply line 122 connected to the port 152 of the selector valve 150 is blocked. In this condition, the friction band 50, the friction clutch 60 and the reverse friction clutch 70 are all released. A parking pawl 49 engages with a parking gear 48 secured to the planet carrier 45, resulting in stopping of the rotation of the driven shaft 13. The actuation of the pawl 49 is performed in conjunction with an operative lever by the driver's seat (not shown).

DRIVE RANGE

When the spool valve 151 is moved to the drive or D position, the main supply line 122 is connected to the ports 153 and 154 through the port 152. In this condition the low gear connection and the high gear connection are automatically controlled in accordance with vehicle speed and engine torque demand or throttle opening.

Generally, the low gear connection is established at relatively low vehicle speed and the high gear connection is established at relatively high vehicle speed. As hereinafter described, when the main jet in the fifth control element 250 is deflected to the output port 255, and thus the spool valve 172 of the shift valve 170 is moved to the left, the main line pressure in the line 124 is applied to the front pressure chamber 52a of the hydraulic actuator 51 and to the hydraulic actuator 65 through the ports 173 and 175 of the shift valve 170, the line 182, the nozzle 281, the port 282 of the vortex-type element 280, and the line 184. Therefore, the friction clutch 60 is engaged and the friction band 50 is released, whereby the high-gear connection is established.

Figure 6:
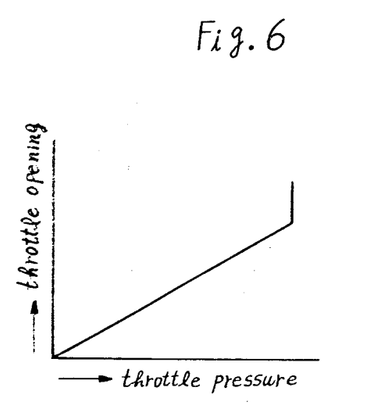
FIG. 6 is a graph showing the relationship between throttle opening and throttle pressure produced in a throttle valve.

Referring to FIG. 6, there is shown the relationship between throttle opening and throttle pressure. Throttle pressure is increased in substantially proportional relationship with increase in throttle opening, and is equal to min line pressure in the main line 122 under full throttle opening. Throttle pressure under the full throttle opening is supplied in the kickdown operation as hereinafter described.

Figure 7:
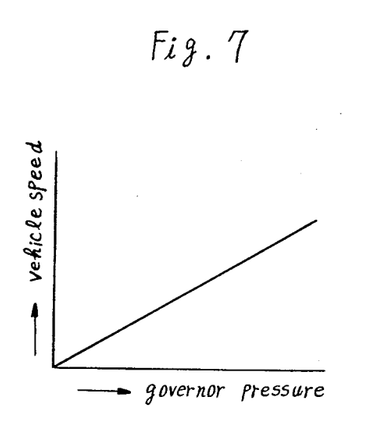
FIG. 7 is a graph showing the relationship between vehicle speed and governor pressure produced in a governor valve.

Referring to FIG. 7, there is shown the relationship between vehicle speed and governor pressure. Governor pressure is increased in proportion to increase in vehicle speed.

Figure 8:
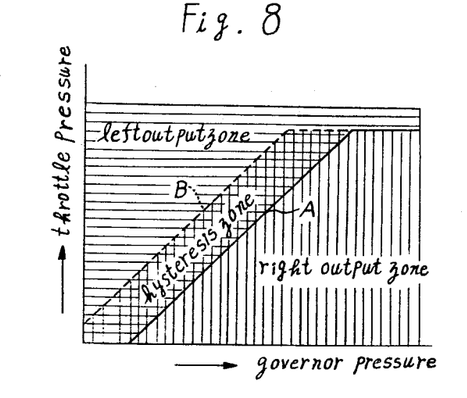
FIG. 8 is a graph showing an output characteristic of a fifth control element by way of showing a relationship between throttle pressure and governor pressure under no effect of third and fourth control elements.

Referring to FIG. 8, there is shown an output characteristic of the output ports 254 and 255 of the fifth control element 250 with the relationship between throttle pressure and governor pressure, but without the influence of the control inputs from third to fourth control elements.

The main jet in the fifth control element 250 is maintained in the output port 254 or a left output zone by the wall attachment effect under the initial running condition of the vehicle, since the control pressure in the control nozzle 253 is higher than that in the control nozzle 252, but is shifted over to the output port 255 or a right output zone, when the governor pressure is increased, and thus the control pressure in the nozzle 253 becomes lower by predetermined value than that in the nozzle 252. The change point of the main jet from the left output zone to the right output zone is shown at a solid line A in FIG. 8. The main jet maintained in the right output zone is shifted over to the left output zone, when governor pressure is decreased from higher governor pressure and thus the control pressure in the nozzle 253 becomes higher by predetermined value than that in the nozzle 252. The change point of the main jet from the right output zone to the left output zone is shown at a dotted line B.

Such a control element of a wall attachment type has a hysteresis characteristic in the switching action of the main jet. Thus, a hysteresis zone enclosed by the solid line A and the dotted line B, as shown in FIG. 8, is produced in the shifting of the gear connections.

The third and fourth control elements 230 and 240 may vary the output of the fifth control element as a function of only the vehicle speed at low vehicle speed and high vehicle speed respectively. Relatively low constant biasing pressure is applied to the control nozzle 232 of the third control element 230 through the orifice 239. On the other hand, relatively high constant biasing pressure compared with the relatively low constant biasing pressure is applied to the control nozzle 243 of the fourth control element through the orifice 249. Governor pressure from the governor valve 80 is supplied to the other control nozzles 233 and 242 through the line 123.

Figure 9:
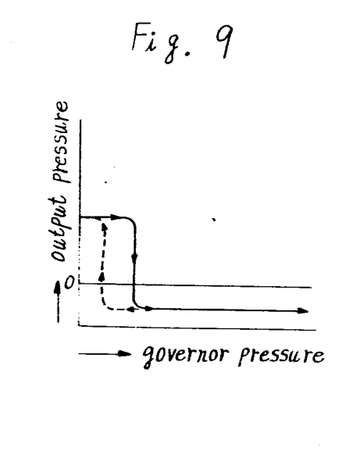
FIG. 9 is a graph showing an output characteristic of a right output port of a third control element.

Referring to FIG. 9 there is shown an output characteristic in the output port 235 of the third control element 230. As lone as the governor pressure is lower than the biasing pressure applied to the control nozzle 232, the main jet in the third control element 230 is maintained deflected to the output port 235, whereby the output pressure from the output port 235 is maintained at high. However, when the governor pressure becomes higher by a predetermined value than the constant biasing pressure with increase in vehicle speed, the main jet in third control element 230 is shifted over from the output port 235 to the output port 234 due to the pressure differential therebetween, whereby the output pressure from the output port 235 is maintained at low, even if the governor pressure is further increased. The main jet is shifted over from the output port 234 to the output port 235, when the governor pressure becomes lower by the predetermined value than the constant biasing pressure, whereby the output pressure from the output port 235 is maintained at high. As above mentioned, the hysteresis zone is produced at switching action of the main jet by the wall attachment effect.

Figure 10:
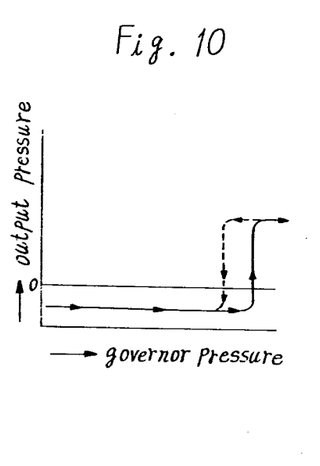
FIG. 10 is a graph showing an output characteristic of a right output port of a fourth control element.

Referring to FIG. 10, there is shown an output characteristic in the output port 245 of the fourth control element 240 in the condition that relatively high biasing pressure is supplied to the control nozzle 243. The main jet in the fourth control element 240 is deflected to the output port 244, as long as governor pressure is lower than the relatively high constant biasing pressure so that the output pressure from the other output port 245 is maintained at low. However, when governor pressure becomes higher by a predetermined value than the relatively high constant biasing pressure, the main jet in the fourth control element 240 is shifted over from the output port 244 to the output port 245 due to the pressure differential therebetween, whereby output pressure from the output port 245 is maintained at high. Since the fourth control element also has a hysteresis characteristic, the main jet therein is shifted over from the output port 245 to the output port 244, when the governor pressure becomes lower by the predetermined value than the relatively high constant biasing pressure. The outputs from both output ports 245 and 235 are applied to the control nozzles 252 and 253 of the fifth control element 250 as control inputs.

Figure 11:
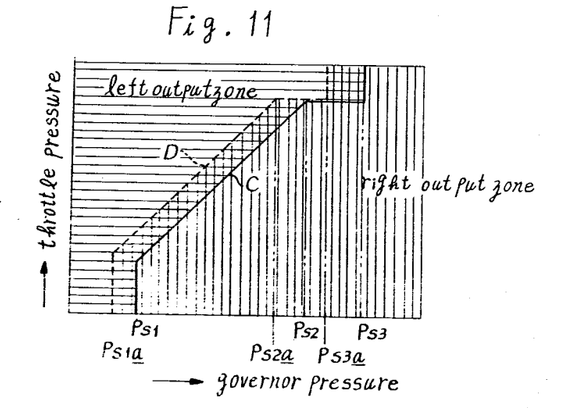
FIG. 11 is a graph showing an output characteristic of the fifth control element with the relationship between throttle pressure and governor pressure.

Referring to FIG. 11, there is shown an output characteristic of the fifth control element 250 varied by the control inputs from that shown in FIG. 8. When governor pressure is lower than a predetermined value Ps1, the main jet in the fifth control element 250 is maintained in the output port 254 or a left output zone regardless of variation in throttle pressure. However, when the governor pressure reaches the predetermined value Ps1, the main jet is shifted over from the left output zone to a right output zone to establish the high connection. When governor pressure is between Ps2 and Ps3, and throttle pressure is raised to the main line pressure due to substantially full throttle opening, the main jet deflected to the right output zone is shifted over to the left output zone to establish the low-gear connection required in the kickdown operation. When the main jet is shifted over from the right output zone to the left output zone, predetermined values Ps1, Ps2 and Ps3 of governor pressure drop, respectively, to lower predetermined values Ps1a, Ps2a and Ps3a thereof by the hysteresis characteristic of the third, fourth and fifth control elements 230, 240 and 250.

In the left output zone, pressure fluid is supplied from the output port 254 of the fifth control element 250 through the line 138 to the pressure chamber 177 to move the spool valve 172 of the shift valve 170 rightwardly. Thus, the main line pressure in the line 124 is applied to the rear pressure chamber 52b through the ports 173 and 174, the line 181, the nozzle 271, the port 272, and the line 183 for urging the piston 54 upwardly to engage the friction band 50. The low gear connection is therefore established. At the same time, fluid in the front pressure chamber 52a is exhausted to the sump 109 through the line 184, the port 282, the nozzle 281 of the vortex-type element 280, the line 182, and the ports 175 and 179. Under the above-mentioned condition, the vortex-type element 270 restricts fluid flow into the rear pressure chamber 52b, whereby abrupt and sudden engagement of the friction band 50 is avoided.

When governor pressure becomes higher than a value on the change line shown at a solid line C in FIG. 11 with increased vehicle speed, the main jet in the fifth control element 250 is shifted over to the right output zone. Under the above-mentioned condition, pressure fluid is supplied from the output port 255 of the fifth control element through the line 139 to the pressure chamber 178 to move the spool valve 172 of the shift valve 170 leftwardly as viewed, and thus main line pressure in the line 124 is applied to the front pressure chamber 52a and to the hydraulic actuator 65 through the ports 173 and 175, the line 182, the nozzle 281, the port 282, and the line 184. At the same time, fluid in the rear pressure chamber 52b is exhausted to the sump 109 through the line 183, the port 272, the nozzle 271, the line 181, and the ports 174 and 176. Under the above-mentioned condition, the vortex-type element 280 restricts fluid flow into the front pressure chamber 52a and the hydraulic actuator 65, whereby the friction clutch 60 is gradually engaged and the piston 54 is downwardly urged to release the friction band 50 gradually. When the friction band 50 is fully disengaged, the high gear connection is established.

In the kickdown operation, the main jet in the first control element 210 is deflected to the output port 214 by high throttle pressure or main line pressure due to the full throttle opening, whereby the main jet in the second control element is deflected to the output port 225 by biasing pressure from the control nozzle 222. Consequently, the main jet in the fifth control element 250 is deflected from the output port 255 to the output port 254, whereby the left output condition is established. Thus, the spool valve 172 of the shift valve 170 is moved rightwardly, whereby the low gear connection is established, as previously noted. Under the above-mentioned condition, the vortex-type element 270 restricts fluid flow into the rear chamber 52b for gradually engaging the friction band 50 to prevent shocks in the downshift operation. The automotive vehicle is rapidly accelerated at reduction speed ratio by increased speed of rotation of the engine. After rapid acceleration, the output pressure in the fifth control element 250 is shifted back from the left output condition to the right output condition, when the accelerator is returned a little. Consequently, the high gear connection is rapidly established.

Abrupt and sudden engagement and disengagement of the friction engaging means 50 and 60 are effectively prevented by means of the vortex-type elements 270 and 280 which restrict fluid flow, in the hydraulic actuators 51 and 65. The abrupt and sudden disengagement are also avoided due to temporary pressure delay according to the response delay of the pumps 90 and 590. Namely, when the spool valve 172 is shifted from high gear connection position to low gear connection position (the low gear connection position is shown in FIG. 5) or vice versa, the fluid pressure in the main lines decreases, since more fluid than that of steady state is consumed in the actuator, and the pumps 90 and 590 are incapable of increasing their delivery instantaneously.

Figures 12, 12D:
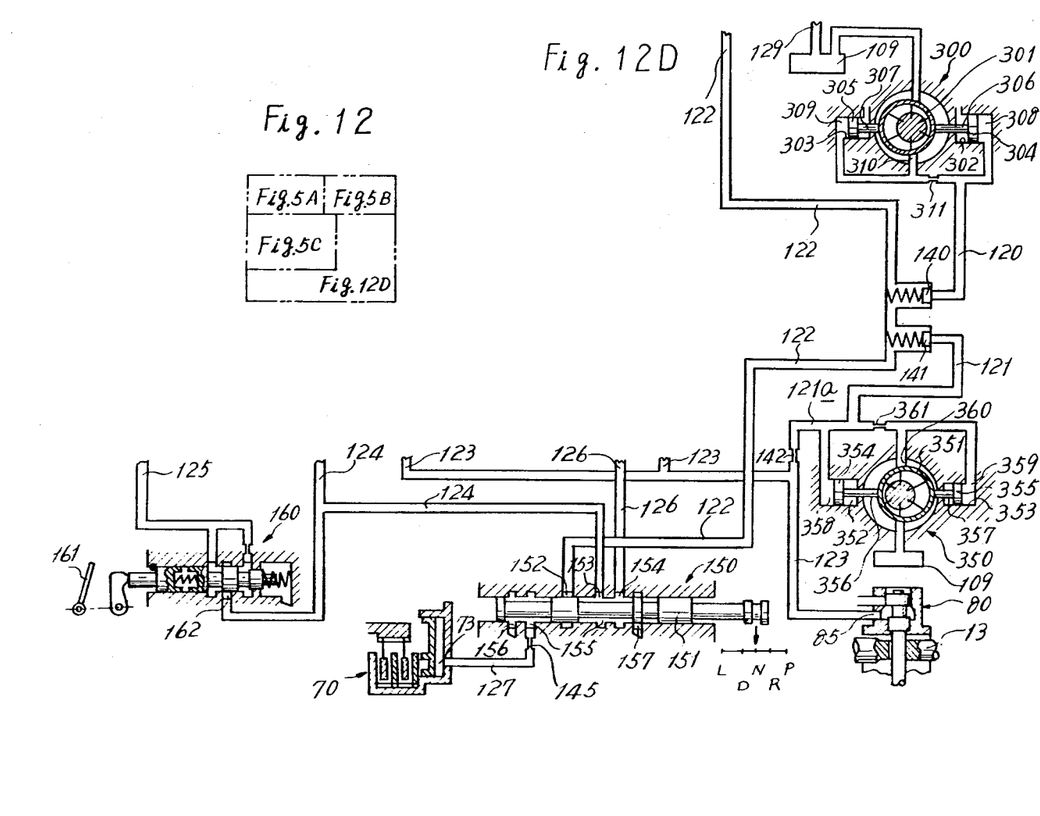

Referring to FIG. 12D, constant flow rate pumps are respectively used as the front and rear pumps 300 and 350 which are of the same type and have the same configuration as the pump shown in FIGS. 3 and 4 except actuators 302, 303, 352 and 353 provided for controlling the eccentricities of casings 301 and 351. The actuators, larger diameter actuator 302 and smaller diameter actuator 303 provided in the front pump 300, comprise slidable pistons 304 and 305, and respective piston rods 306 and 307 extending from the pistons 304 and 305 toward the casing 301 respectively The actuators, larger diameter actuator 352 and smaller diameter actuator 353 provided in the rear pump 350, comprises slidable pistons 354 and 355, and respective rods 356 and 357 extending from the pistons 354 and 355 toward the casing 351. The larger diameter actuators 302 and 353 urge the casings 301 and 351 toward the direction where the eccentricity of the casings is increased. The rear chambers 308 and 358 of the larger diameter actuators 302 and 352 are respectively connected to pump delivery ports 310 and 360 through fixed orifices 311 and 361.

The smaller diameter actuators 303 and 353 in operation urge the casings 301 and 351 toward the direction where the eccentricity of the casings is decreased. The rear chambers 309 and 359 of the smaller diameter actuators are respectively connected to the delivery ports 310 and 360. The effective area ratios of pistons 304 and 354 to 305 and 355 are determined in such a manner that the urging forces of the pistons 304 and 354, and 305 and 355 acting on the casings 301 and 351 are balanced when the pressure differential between the front and rear of the orifices 311 and 361 reaches a predetermined value. The eccentricities of the casings 301 and 351 are automatically regulated to maintain the above-mentioned predetermined pressure differential, whereby flow rate through the orifices 311 and 361 is kept constant.

In the above-mentioned control circuit, abrupt and sudden engagement and disengagement of the friction engaging means are also avoided, since fluid flow in the main lines 122, 124 and 126 is kept substantially constant due to the constant flow rate pumps 300 and 500. Namely, when the spool valve 172 of the shift valve 170 is shifted from high gear connection position to low-gear connection position or vice versa, the fluid flow in the main lines decreases temporarily, since more fluid than normal is consumed in the actuators 51 and 65, and the pumps 300 and 500 cannot increase their delivery instantaneously.

Figures 13, 13A:
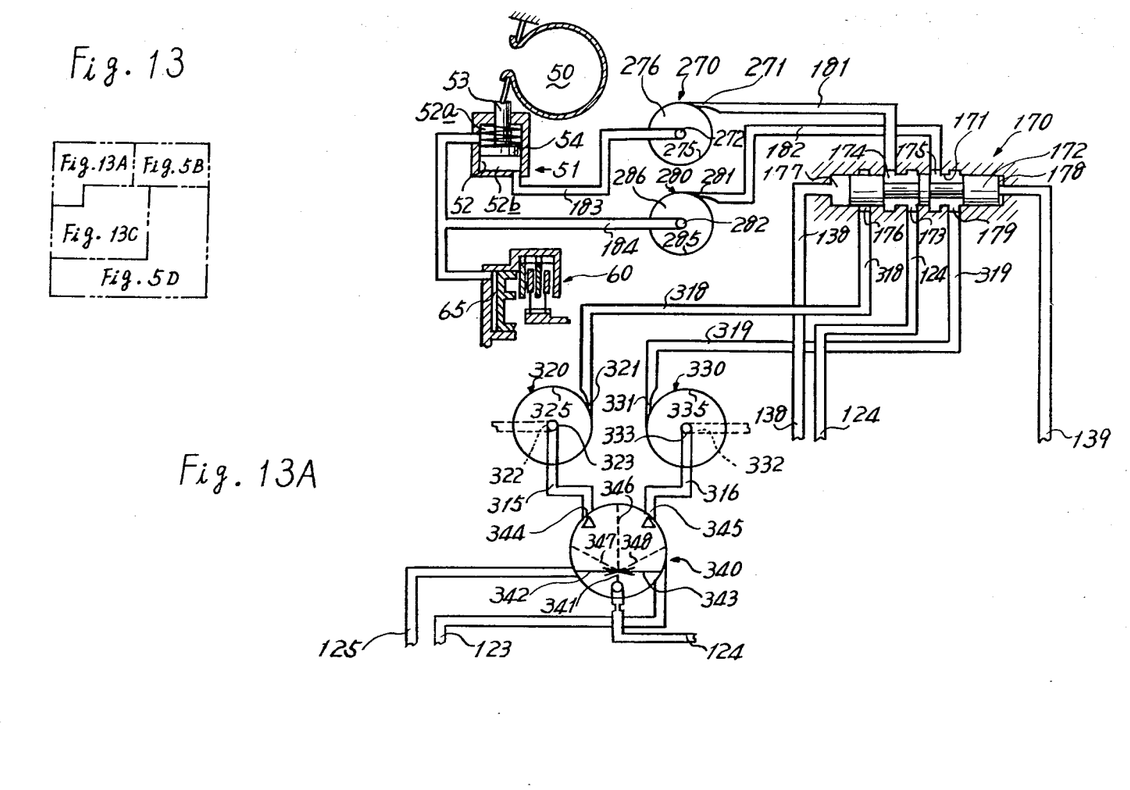
FIG. 13 is a diagrammatic view of a hydraulic control circuit for positively controlling speed in the actuations of friction engaging means in accordance with vehicle speed and throttle opening.
Figure 13C:
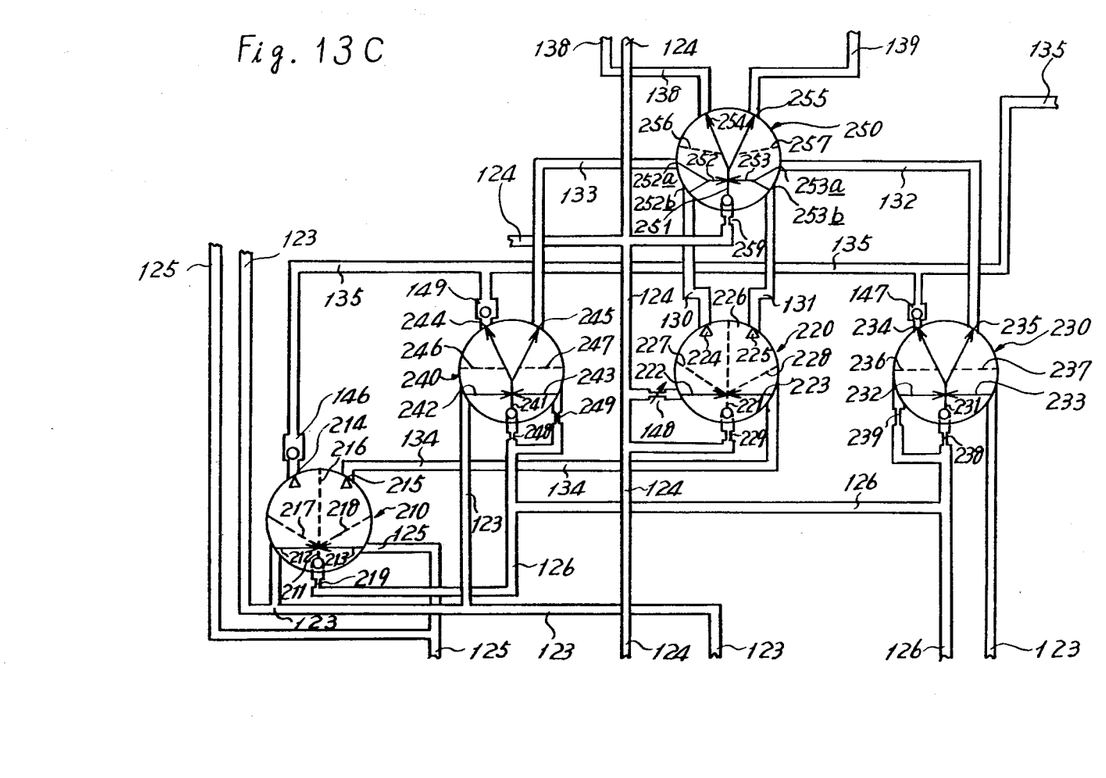

Referring to FIG. 13A, to decrease shocks, another preferred embodiment of the hydraulic circuit is shown for controlling exhaust fluid from each of the hydraulic actuators which actuates one of the friction engaging means, thereby controlling the actuation speed thereof.

Vortex-type pure fluid elements 320 and 330, which are of the same type as the previously mentioned vortex-type element 260, are respectively provided with nozzles 321 and 331, circular section hollow chambers 325 and 335, control ports 323 and 333, and outlet ports 322 and 332. The control ports and the outlet ports are respectively opposite in the center of both sidewalls of the hollow chambers.

A control element 340 of the deflection proportional type is provided with a main nozzle 341, a pair of control nozzles 342 and 343, a pair of output ports 344 and 345, a center vent 346, and a pair of side vents 347 and 348.

The nozzles 321 and 331 of the elements 320 and 330 are respectively connected to the exhaust ports 176 and 179 of the shift valve 170 through lines 318 and 319. The outlet ports 322 and 332 are respectively connected to the sump 109. The control ports 322 and 333 are respectively connected by lines 315 and 316 to the output ports 344 and 345 of the control element 340. The main nozzle 341 is connected to the line 124. The control nozzle 342 is connected to the line 125 to be supplied with throttle pressure from the throttle valve 160. The other control nozzle 343 is connected to the line 123 to be supplied with governor pressure from the governor valve 80.

Therefore, the main jet in the control element 340 is divided between the output ports 344 and 345 with the relationship of pressure differential between throttle pressure and governor pressure, and is supplied to the control ports 323 and 333 of the vortex-type elements 320 and 330 as control inputs. In the elements 320 and 330, fluid flow through each of the nozzles 321 and 331 is restricted when pressure in each of control inputs is high. Therefore, when the pressure differential between throttle pressure and governor pressure is great, i.e., when the vehicle is rapidly accelerated or decelerated, the jet from the main nozzle 341 is mainly deflected, to either of the output ports 344 and 345, whereby pressure differential between output ports 344 and 345 becomes great to moderately restrict fluid flow through either the nozzle 321 or 331 to delay the actuation speed of each of the hydraulic actuators which provides the engaging force with one of the friction engaging means. Consequently, shocks in the engagement or the disengagement of the friction engaging means are avoided when the vehicle is rapidly accelerated or decelerated, whereby automatic shifting of the gear connections can be smoothly effected. When the pressure differential between throttle pressure and governor pressure is small, the jet from the main nozzle 341 is substantially equally divided between the output ports 344 and 345. Accordingly, the control input pressure to the control elements 320 and 330 is low, fluid flows in the nozzles 321 and 331 are only mildly restricted, whereby the actuation speed of each of the hydraulic actuators for the friction engaging means is relatively fast so that the engagement and the disengagement of the friction engaging means are effected rather rapidly.

The above-mentioned control of the actuation speed of each of the hydraulic actuators for the friction engaging means is available when engine speed is large in comparison with vehicle speed as in the kickdown operation. The actuation speed of each of the hydraulic actuators becomes slower, when shocks are apt to be caused. When engine speed is substantially corresponding to vehicle speed, the gear connections may be changed relatively quickly. When the vehicle is decelerated, the control element 270 restricts fluid flow effectively, whereby the actuation speed of the hydraulic actuator 51 becomes slower and shocks are avoided. By the above-mentioned control of the actuation speed of each of the hydraulic actuators, the speed of the engagement and the disengagement of the friction engaging means becomes slower and thus, in the initial condition of the engagement and disengagement thereof, one of the friction engaging means increases a slipping engagement, while the other is released slowly, thereby to avoid shocks effectively. However, the friction engaging means are finally frictionally engaged positively, since the predetermined pump pressure is high enough to provide sufficient friction engaging force. Consequently, when the vehicle is rapidly accelerated or decelerated, shocks in the shifting of the gear connections are avoided and the shifting of the gear connections is effected smoothly and positively.

In each of the above-mentioned control circuits, hydraulic constant pressure fluid is supplied, regardless of the variation in engine speed and vehicle speed of rotation, to each of the hydraulic actuators for the friction engaging means by the automatic regulation of pump delivery pressure from the variable-capacity-type pumps 90 and 590. The supplied pressure is preset to a sufficiently high pressure to transmit the highest torque required in the accelerating operation, and valve means such as the pressure-regulating valve for regulating the supplied pressure are not required. Moreover delivery flow per 1 revolution is automatically decreased even if pump speed of rotation becomes higher, and therefore fluid is not delivered in quantities more than required. Thus, fluid, exhausted from the pressure-regulating valve in the conventional control circuit, does not exist in the control circuit embodied in the present invention. Therefore, the power consumer in the pumps is very small, and further the power is not increased even if the engine speed and vehicle speed are increased. Moreover, since pump delivery pressure is regulated by the regulation of the eccentricity of the pump casing, means for positively regulating pump delivery pressure, as used in the conventional control circuit, are not required, whereby the control circuit of the present invention becomes simple in construction. Further, since each of the control elements is operated with constant fluid pressure, the operation of each of the control elements is reliable, whereby highly reliable shifting control of the gear connections is accomplished.

In the control circuit embodied in the present invention, constant fluid is exhausted from the vents of the pure fluid control element through the return branch lines to the sump so that fluid flow is constant therein. Some fluid may be exhausted through suitable orifices always to the sump to always provide pressure fluid in the main supply line, where conventional control valves of the spool type are used.

In the control circuit in which control valves of the spool type are used, fluid flows only at the operation of each of the spool valves and at the transition of each of the friction engaging means, and does not flow at any other conditions. Therefore the control circuit is, so to speak, a closed circuit.

Because of the above-mentioned reason, it has been necessary that pump delivery fluid is exhausted through the pressure-regulating valve for regulating the main line pressure. On the other hand, the above-mentioned problems are solved and effective control device for the transmission is given by the use of the pumps of the variable capacity type and return branch lines connected to the sump.

While the invention has been described by means of specific examples and specific embodiment, it should be understood that the invention may be embodied in other structural forms without departing from the scope of the invention which is defined in the claims.

What I claim is:

1. An automatic transmission mechanism including a drive shaft connected to an engine, a hydraulic torque converter having an input member driven by said drive shaft and an output member, an intermediate shaft connected to said output member, a driven shaft drivingly connected to drive wheels, a gear unit driven by said intermediate shaft and driving said driven shaft, friction engaging means for completing a plurality of driving connections between said intermediate shaft and drive shaft, fluid-pressure-operated hydraulic actuators for actuating said friction engaging means, and a hydraulic control system comprising pressure fluid supply means for supplying pressure fluid, throttle means for producing a throttle pressure fluid responsive to throttle opening, governor means for producing a governor pressure fluid responsive to vehicle speed, first control means including at least one pure fluid control element for deflecting the pressure fluid from said supply means in response to said throttle and governor pressure fluids to produce a first control pressure fluid, second pure fluid control means including a main nozzle connected to said supply means, control nozzle means operably connected to said first control means for deflecting the pressure fluid from said main nozzle in response to said first control pressure fluid to produce a second control pressure fluid, and output means for receiving said second control pressure fluid, and shift valve means disposed between said hydraulic actuators and said supply means and adapted to be actuated by said second control pressure fluid from said second pure fluid control means for selectively supplying the pressure fluid from said supply means to said hydraulic actuators therethrough to control the selective actuation of said friction engaging means.

2. An automatic transmission mechanism as set forth in claim 1 wherein said second pure fluid control means is of a wall attachment type and has a hysteresis characteristic.

3. An automatic transmission mechanism as set forth in claim 1 wherein said pressure fluid supply means comprises at least one pump of a variable capacity type having self-regulating means for regulating delivery flow therefrom in response to self-delivered fluid pressure thereof, and return branch lines connected to a sump, whereby fluid pressure supplied from said pump is maintained at constant.

4. An automatic transmission mechanism as set forth in claim 1 wherein said pressure fluid supply means comprises at least one pump of a variable capacity type having self-regulating means for regulating delivery flow therefrom in response to pressure differential between the front and rear of an orifice which is connected to a pump delivery port in said pump, and return branch lines connected to a sump, whereby fluid flow in the control system is maintained at constant.

5. An automatic transmission mechanism including a drive shaft connected to an engine, a hydraulic torque converter having an input member driven by said drive shaft and an output member, and intermediate shaft connected to said output member, a driven shaft drivingly connected to drive wheels, a gear unit driven by said intermediate shaft and driving said driven shaft, friction engaging means for completing a plurality of driving connections between said intermediate shaft and drive shaft, fluid pressure operated hydraulic actuators for actuating said friction engaging means, and a hydraulic control system comprising pressure fluid supply means for supplying pressure fluid, throttle means for producing a throttle pressure fluid responsive to throttle opening, governor means for producing a governor pressure fluid responsive to vehicle speed, first control means including at least one pure fluid control element for deflecting the pressure fluid from said supply means in response to said throttle and governor pressure fluids to produce a first control pressure fluid, second pure fluid control means including a first main nozzle connected to said supply means, two opposite control nozzles for deflecting the pressure fluid from said first main nozzle, one of said control nozzles being connected to said governor means, the other control nozzle being connected to said supply means through a restrictor to produce a predetermined pressure fluid, and first output means for receiving a second control pressure fluid in response to said predetermined pressure fluid and said governor pressure fluid, third pure fluid control means including a second main nozzle connected to said supply means, control nozzle means operably connected to said first control means and to said first output means for deflecting the pressure fluid from said second main nozzle in response to said first and second control pressure fluids to produce a third control pressure fluid, and second output means for receiving said third control pressure fluid, and shift valve means disposed between said hydraulic actuators and said supply means and adapted to be actuated by said third control pressure fluid from said third pure fluid control means for selectively supplying the pressure fluid from said supply means to said hydraulic actuators therethrough to control the selective actuation of said friction engaging means.

6. An automatic transmission mechanism as set forth in claim 1 wherein said hydraulic control system further comprises third pure fluid control means disposed between said shift valve means and said hydraulic actuators, said third pure fluid control means being of a vortex-type having a diode characteristic for controlling the pressure fluid from said supply means to said hydraulic actuators to delay the actuation speed of said friction engaging means, thereby to avoid shocks caused in the actuation of said friction engaging means.

7. An automatic transmission mechanism as set forth in claim 1 wherein said hydraulic control system further comprises third pure fluid control means of a vortex-type including a main nozzle connected to said supply means, a control port operably connected to said first control means, and an output port connected to said torque converter, said control port being opposite to said output port, thereby to increase fluid pressure supplied to said torque converter to prevent the cavitation therein.

8. An automatic transmission mechanism as set forth in claim 1, wherein said hydraulic control system further comprises third pure fluid control means including a second main nozzle connected to said supply means, two opposite control nozzles connected to said throttle and governor means, respectively, and second output means for receiving a third control pressure fluid responsive to said throttle and governor pressure fluids, and fourth pure fluid control means of a vortex-type including a third main nozzle connected to said hydraulic actuators, a control port connected to said second output means of said third pure fluid control means, and an output port for exhausting pressure fluid from said hydraulic actuators to a sump therethrough, said output port being opposite to said control port, thereby to delay the actuation speed of said friction engaging means to avoid shocks caused in the actuation of said friction engaging means.

9. An automatic transmission mechanism including a drive shaft connected to an engine, a hydraulic torque converter having an input member driven by said drive shaft and an output member, an intermediate shaft connected to said output member, a driven shaft drivingly connected to drive wheels, a gear unit driven by said intermediate shaft and driving said driven shaft, friction engaging means for completing a plurality of driving connections between said intermediate shaft and drive shaft, fluid-pressure-operated hydraulic actuators for actuating said friction engaging means, and a hydraulic control system comprising pressure fluid supply means for supplying a pressure fluid, throttle means for producing a throttle pressure fluid responsive to throttle responsive to vehicle speed, first control means including at least one pure fluid control element for deflecting the pressure fluid from said supply means in response to said throttle and governor pressure fluids to produce a first and second control pressure fluid, said first control pressure fluid being produced when said throttle pressure is lower than said governor pressure, said second control pressure fluid being produced when said throttle pressure is higher than said governor pressure, second pure fluid control means including a first main nozzle connected to said supply means, first two control nozzles for deflecting the pressure fluid from said first main nozzle, one of said first control nozzles being connected to said governor means, the other first control nozzle being connected to said supply means through a first restrictor to produce a first predetermined pressure fluid, and first output means receiving a third control pressure fluid when the governor pressure is lower than said first predetermined pressure, third pure fluid control means including a second main nozzle connected to said supply means, second two control nozzles for deflecting the pressure fluid from said second main nozzle, one of said second control nozzles being connected to said governor means, the other second control nozzle being connected to said supply means through a second restrictor to produce a second predetermined pressure fluid, and second output means receiving a fourth control pressure fluid when the governor pressure is higher than said second predetermined pressure, said first predetermined pressure being lower than said second predetermined pressure, fourth pure fluid control means including a third main nozzle connected to said supply means, third two opposite control nozzles for deflecting the pressure fluid from said third main nozzle to produce a fifth control pressure fluid, one of said third control nozzles being connected to be supplied with said first and fourth control pressure fluids, the other third control nozzle being connected to be supplied with said second and third control pressure fluids, and third output means receiving said fifth control pressure fluid, and shift valve means disposed between said hydraulic actuators and said supply means and adapted to be actuated by said fifth control pressure fluid from said fourth pure fluid control means for selectively supplying the pressure fluid from said supply means to said hydraulic actuators therethrough to control the selective actuation of said friction engaging means.

10. An automatic transmission mechanism including a drive shaft connected to an engine, a hydraulic torque converter having an input member driven by said drive shaft and an output member, an intermediate shaft connected to said output member, a driven shaft drivingly connected to drive wheels, a gear unit driven by said intermediate shaft and driving said driven shaft, friction engaging means for completing a plurality of driving connections between said intermediate shaft and drive shaft, fluid-pressure-operated hydraulic actuators for actuating said friction engaging means, and a hydraulic control system comprising pressure fluid supply means for supplying a pressure fluid, throttle means for producing a throttle pressure fluid responsive to throttle opening, governor means for producing a governor pressure fluid responsive to vehicle speed, first pure fluid control means including a first main nozzle connected to said supply means, first two opposite control nozzles for deflecting the pressure fluid from said first main nozzle, one of said first control nozzles being connected to said governor means and the other first control nozzle being connected to said throttle means, and first two output ports positioned to receive the pressure fluid deflected in response to throttle and governor pressure fluids, one of the first output ports receiving a first control pressure fluid which is produced when the governor pressure is higher than the throttle pressure, second pure fluid control means including a second main nozzle connected to said supply means, second two opposite control nozzles for deflecting the pressure fluid from said second main nozzle, one of the second control nozzles being connected to said supply means through a restrictor to produce a predetermined pressure fluid and the other connected to said one of the first output ports, and second two output ports receiving second and third control pressure fluids, respectively, said second control pressure fluid being produced when said first control fluid pressure is higher than the predetermined fluid pressure, said third control pressure fluid being produced when the first control fluid pressure is lower than said predetermined fluid pressure, third pure fluid control means including a third main nozzle connected to said supply means, third two opposite control nozzles for deflecting the pressure fluid from said third main nozzle, one of the third control nozzles being supplied with said second control pressure fluid and the other supplied with said third control pressure fluid, and third two output ports positioned to receive a fourth control pressure fluid produced in response to said second and third control pressure fluids, and shift valve means disposed between said hydraulic actuators and said supply means and adapted to be actuated by said fourth control pressure fluid from said third pure fluid control means for selectively supplying the pressure fluid from said supply means to said hydraulic actuators therethrough to control the selective actuation of said friction engaging means.

11. An automatic transmission mechanism as set forth in claim 9 wherein said pressure fluid supply means comprises at least one pump of a variable capacity type having self-regulating means for regulating delivery flow therefrom in response to self-delivered fluid pressure thereof, and return branch lines connected to a sump, whereby fluid pressure supplied from said pump is maintained at constant.

12. An automatic transmission mechanism as set forth in claim 9 wherein said pressure fluid supply means comprises at least one pump of a variable capacity type having self-regulating means for regulating delivery flow therefrom in response to pressure differential between the front and rear of an orifice which is connected to a pump delivery port in said pump, and return branch lines connected to a sump, whereby fluid flow in the control system is maintained at constant.

13. An automatic transmission mechanism as set forth in claim 10 wherein said pressure fluid supply means comprises at least one pump of a variable capacity type having self-regulating means for regulating delivery flow therefrom in response to self-delivered fluid pressure thereof, and return branch lines connected to a sump, whereby fluid pressure supplied from said pump is maintained at constant.

14. An automatic transmission mechanism as set forth in claim 10 wherein said pressure fluid supply means comprises at least one pump of a variable capacity type having self-regulating means for regulating delivery flow therefrom in response to pressure differential between the front and rear of an orifice which is connected to a pump delivery port in said pump, and return branch lines connected to a sump, whereby fluid flow in the control system is maintained at constant.